United States Patent [19]
Heyden et al.

[11] Patent Number: 5,333,644
[45] Date of Patent: Aug. 2, 1994

[54] DUAL SEALING VALVE ASSEMBLY

[75] Inventors: Eddy F. M. G. Heyden, Fontainebleau; Christian LaCour, Vanves; Michel M. A. A. Lechevalier, Bombon; Christophe N. Riou, Savigny Le Temple, all of France

[73] Assignee: Societe Nationale D'Etude et de Construction de Moteurs D'Aviation, Paris, France

[21] Appl. No.: 180,277

[22] Filed: Jan. 12, 1994

[30] Foreign Application Priority Data

Jan. 20, 1993 [FR] France ................................ 93 00509

[51] Int. Cl.$^5$ ............................................. F16K 1/00
[52] U.S. Cl. .......................... 137/614.18; 137/614.19; 251/356
[58] Field of Search ...................... 137/614.11, 614.19, 137/614.18, 630.22; 251/321, 77, 356

[56] References Cited

U.S. PATENT DOCUMENTS

| | | | |
|---|---|---|---|
| 2,905,487 | 9/1959 | Schifter | 137/614.19 |
| 3,587,634 | 6/1971 | Krause | 137/614.11 |
| 3,895,651 | 7/1975 | Okuda et al. | 137/614.4 |
| 4,270,571 | 6/1981 | Paulivkonis | 137/614.19 |
| 4,461,318 | 7/1984 | Bräkelmann | 137/614.11 |

FOREIGN PATENT DOCUMENTS

| | | |
|---|---|---|
| 0098914 | of 1984 | European Pat. Off. . |
| 2159110 | of 1972 | Fed. Rep. of Germany . |
| 28498 | of 1905 | United Kingdom ........... 137/614.18 |

*Primary Examiner*—A. Michael Chambers
*Attorney, Agent, or Firm*—Bacon & Thomas

[57] ABSTRACT

A valve assembly is disclosed having a valve body with dual valve seats and a movable valve member located in the valve body having dual sealing surfaces to bear against the two value seats. One of the valve seats has a sharp-edged configuration which is contacted by a generally frusto-conical sealing surface on a movable primary valve member to crush or break any foreign material in the fluid flow stream. The conical sealing surface and the sharp-edged valve seat also act as a seal to block the fluid flow passageway. A secondary valve member is attached to the primary valve member and has a second sealing surface configured to engage the second valve seat of the valve body. The second valve seat and the second sealing surface may be annular and each have a partially, spherical, cross-sectional configuration. The secondary valve member is connected to the primary valve member such that they may move relatively to each other along their axis of movement. The primary valve member may also be skewed relative to its axis of movement, caused by any foreign particles between the sharp-edged valve seat and the frusto-conical sealing surface without such skewed movement being imparted to the secondary valve member. Thus, even if the primary valve member should be skewed relative to its axis of movement, thereby preventing the first sealing surface from blocking the fluid flow passageway, the sealing surface of the secondary valve member will still contact the second valve seat to block the fluid flow passageway.

9 Claims, 2 Drawing Sheets

DUAL SEALING VALVE ASSEMBLY

BACKGROUND OF THE INVENTION

The present invention relates to a valve assembly for controlling fluid flow, more particularly such a valve assembly having dual valve seats to ensure the sealing of the fluid passageway.

Fluid feed valves located in a fluid conduit, or attached to fluid enclosures, such as tanks, to control the fluid flow from or between these elements are, of course, well known in the art. Typically, known valves have a valve body defining a valve seat against which a movable valve member may bear to close off the fluid flow passageway. Displacement of the movable valve member relative to the valve body moves the valve member away from the valve seat in order to open the fluid passageway and allow fluid to flow through the valve.

The valve member of the known valves is typically made of a hard material, such as steel, and the valve body is made of a softer material, such as a light alloy. The movable valve member may have a generally conical sealing surface which is designed to bear against the valve seat defined by the valve body, which may comprise a sharp edge. The sharp-edged construction of the valve seat enables the movable valve member to cut any foreign materials in the fluid which may be wedged between the valve seat and the sealing surface when the valve is closed. However, such foreign material may deleteriously effect the sealing of the valve seat by causing the movable member to be slightly skewed from its axis of travel. Quite obviously, this will prevent effective sealing of the valve assembly and render it largely ineffective. This drawback arises from the use of the sharp-edged valve seat to both cut the undesired foreign material, and to seal the fluid flow passageway.

SUMMARY OF THE INVENTION

A valve assembly is disclosed having a valve body with dual valve seats and a movable valve member located in the valve body having dual sealing surfaces to bear against the two valve seats. One of the valve seats has a sharp-edged configuration which is contacted by a generally frusto-conical sealing surface on a movable primary valve member to crush or break any foreign material in the fluid flow stream. The conical sealing surface and the sharp-edged valve seat also act as a seal to block the fluid flow passageway.

A secondary valve member is attached to the primary valve member and has a second sealing surface configured to engage the second valve seat of the valve body. The second valve seat and the second sealing surface may be annular and each have a partially, spherical, cross-sectional configuration. The secondary valve member is connected to the primary valve member such that they may move relatively to each other along their axis of movement. The primary valve member may also be skewed relative to its axis of movement, caused by any foreign particles between the sharp-edged valve seat and the frusto-conical sealing surface without such skewed movement being imparted to the secondary valve member. Thus, even if the primary valve member should be skewed relative to its axis of movement, thereby preventing the first sealing surface from blocking the fluid flow passageway, the sealing surface of the secondary valve member will still contact the second valve seat to block the fluid flow passageway.

The primary valve member defines a bore hole into which is inserted a cylindrical extension of the secondary valve member. An O-ring seal is located between the inner surface of the bore hole and the outer surface of the cylindrical extension. An end wall of the cylindrical extension defines an opening through which extends a rod threadingly engaged with the primary valve member. An opposite end of the rod has a headed portion and a spring is inserted between the end wall of the cylindrical extension and the headed portion of the rod. Clearances between the interior surface of the cylindrical extension and the head, as well as between the rod and the end wall of the cylindrical extension enable communication between the interior of the cylindrical extension and the interior of the bore hole on one side of the O-ring seal.

The primary valve member has a generally cylindrical outer peripheral surface extending generally parallel to its axis of movement which defines a plurality of longitudinally extending grooves each having one end opening through the frusto-conical sealing surface. The grooves extend less than the full axial length of the primary valve member so as to define a solid collar portion extending about the end away from the frusto-conical sealing surface.

The valve body defines a bore in which the primary valve member is slidably received, the solid collar portion of the primary valve member extending into the bore of the valve body a distance D 22. The primary and secondary valve members define facing stop surfaces which are spaced apart a distance D 24/40 when the primary and secondary valve members are both in their closed positions. The distance D 22 is greater than the distance D 24/40 in this configuration in which the first sealing surface is in contact with the sharp-edged valve seat and the second sealing surface is in contact with the second, spherical valve seat.

The present invention separates the portion of the valve which cuts the undesired foreign bodies from the sealing of the passageway to ensure effective sealing of the fluid flow passageway. Guidance of the primary valve member is also improved, thereby reducing the danger of any skewed motion of the valve member relative to its axis of travel, again, to improve the sealing of the fluid flow passageway.

DETAILED DESCRIPTION OF THE PREFERRED EMBODIMENT

Figure 1:
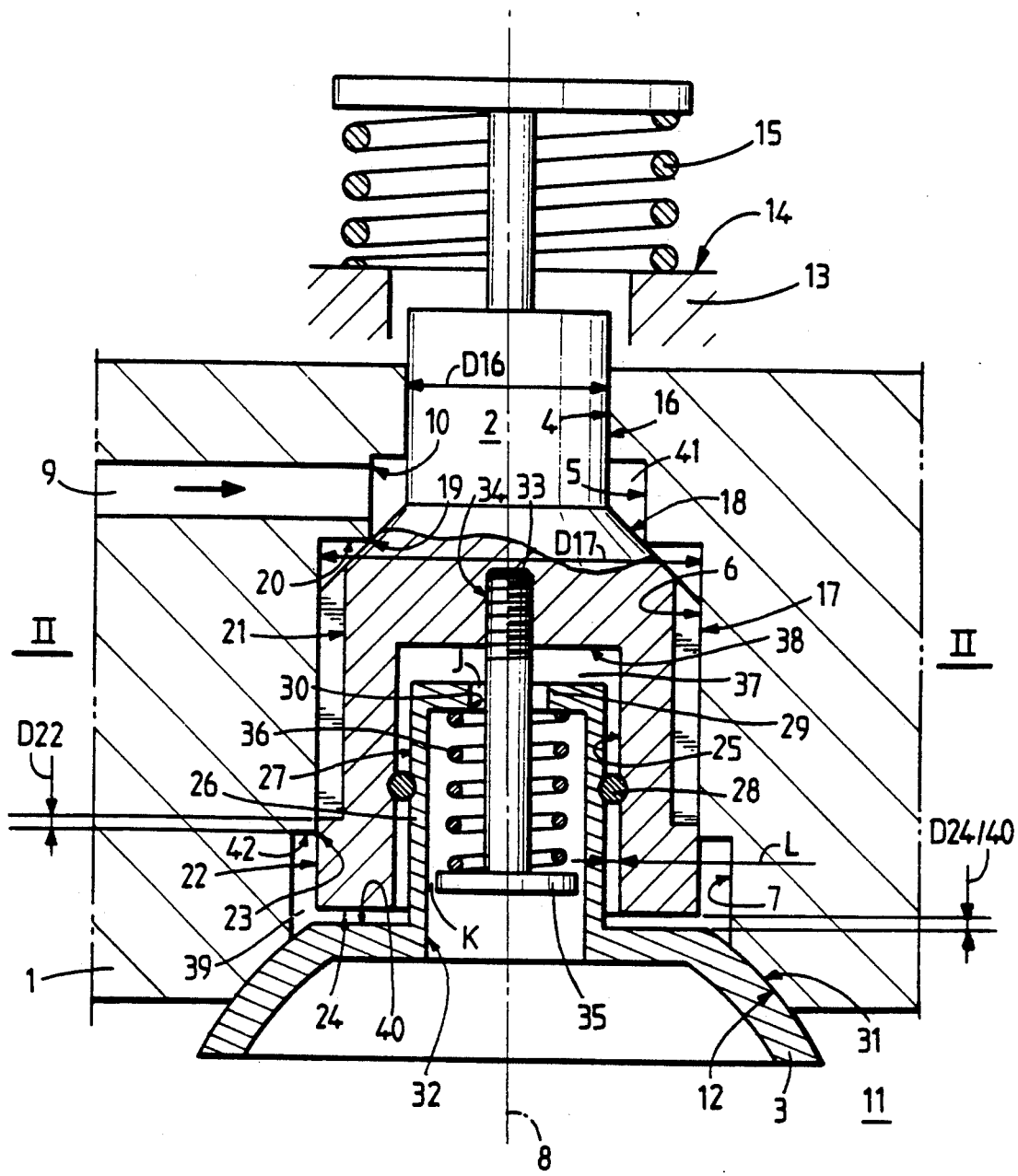
FIG. 1 is a cross-sectional view of a valve assembly according to the present invention.
Figure 2:
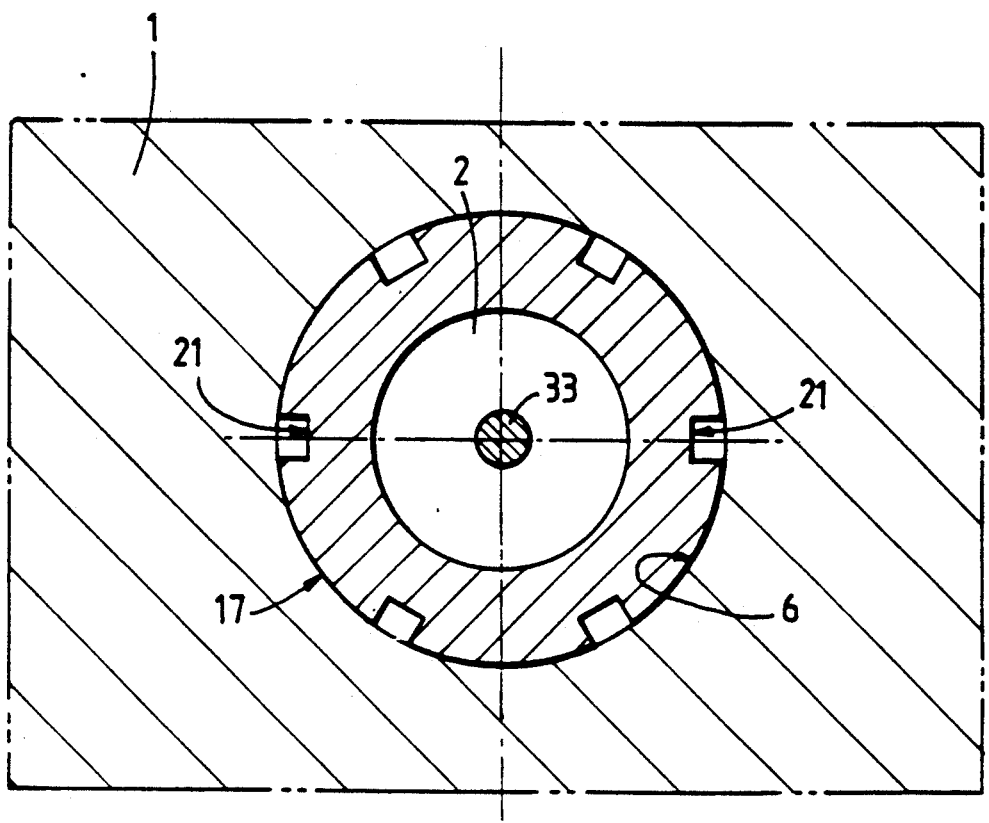
FIG. 2 is a cross-sectional view taken along line II—II in FIG. 1.

The fluid-feed valve assembly according to the present invention comprises a valve body 1, a primary valve member 2 and a secondary valve member 3. Valve body 1 defines generally cylindrical and coaxial bore holes 4, 5, 6 and 7 each having an axis 8 and defining a portion of the fluid flow passageway through the valve body 1. A first conduit 9 communicates with the bore hole 5, by orifice 10 and extends externally of the valve body 1 to be connected to a first fluid tank or enclosure. A second tank or enclosure 11 is separated from the bore hole 7 by an annular valve seat 12, having a cross-sectional configuration which is partially spherical, defined by the valve body 1. The valve seat 12 is generally annular and is concentric about axis 8.

Valve body 1 may have component 13 either rigidly affixed thereto, or formed integrally therewith, which defines a rest surface 14 for spring 15 placed between the primary valve member 2 and the component 13. Spring 15 normally biases the primary valve member 2 to its closed position, i.e., upwardly as illustrated in FIG. 1.

The primary valve member 2 comprises a generally cylindrical surface 16 which is slidably received in bore 4 such that the primary valve member 2 is axially movable along axis 8 between open and closed positions. The primary valve member 2 also comprises a cylindrical surface 17 coaxial with the first cylindrical surface 16, which surface 17 has a diameter D17 which is greater than the diameter D16 of cylindrical surface 16. Cylindrical surface 17 is slidably received in bore hole 6 of the valve body 1.

A frusto-conical sealing surface 18 connects the cylindrical surfaces 16 and 17 and acts as a sealing surface against a sharp-edged valve seat 19 defined at the intersection of bore 5 with a transverse shoulder 20 which interconnects the bores 5 and 6 of the valve body 1.

The cylindrical surface 17 defines a plurality of circumferentially spaced, axially extending grooves 21 which open through the frusto-conical surface 18 and the cylindrical surface 17. The lengths of the grooves 21 are less than the axial length of the primary valve member 2 so as to define a solid cylindrical collar 22 at the end of the primary valve member 2 facing away from the frusto-conical surface 18. When the frusto-conical surface 18 is in sealing contact with the sharp-edged valve seat 19, the solid cylindrical collar 22 extends into the bore 6 from the transverse edge 23 formed by a transverse shoulder 42 which interconnects bore holes 6 and 7 a distance D22. The end of the primary valve member 2 facing away from the frusto-conical surface 18 defines a generally transverse stop surface 24 which extends generally perpendicular to the axis 8. The primary valve member 2 also defines a bore hole 25 extending inwardly from the surface 24 and having an end wall 38.

The secondary valve member 3 comprises a cylindrical extension 26 extending upwardly therefrom such that it enters bore hole 25, the cylindrical extension 26 defining an external cylindrical surface 27. An O-ring seal 28 is located between the external surface 27 and the interior surface of the bore hole 25 so as to seal the volumes 37 and 39 and prevent them from communicating with each other. The cylindrical extension 26 has an end wall 29 which defines an opening 30 at one end, and a generally annular sealing surface 31 at a second end. The sealing surface 31 is annular about axis 8 and has a cross-sectional configuration forming a portion of a spherical surface such that it may sealingly engage the second valve seat 12 defined by the valve body 1. A bore 32 extends inwardly into the cylindrical extension 26 and communicates with the enclosure 11.

A rod member 33 extends through the hole 30 with a clearance J and has a first end 34 threadingly engaged with the primary valve member 2. An opposite end of the rod member 33 defines a head 35 which is located within the bore 32 with clearance K around the head 35. Spring 36 is interposed between the end wall 29 and the head 35 to bias the secondary valve member 3 toward its closed position, generally upwardly as illustrated in FIG. 1, urging sealing surface 31 into contact with valve seat 12.

The volume 37 defined between the end wall 29 and the end 38 of bore hole 25 communicates freely with the second enclosure 11 via the hole 30, clearance J and the clearance K around the head 35. Volume 39 between the bore hole 7 and the external surface 27 of the cylindrical extension 26 will communicate, when the frusto-conical surface 18 is out of contact with the sharp-edged valve seat 19 and when the spherical sealing surface 31 is out of contact with the spherical valve seat 12 with the second enclosure 11 and also, via grooves 21, with the first conduit 9.

Spring 15, between the primary valve member 2 and the valve body component 13 biases the frusto-conical sealing surface 18 into sealing contact with the sharp-edged valve seat 19.

Secondary valve member 3 also comprises a generally transverse stop surface 40 which extends generally perpendicular to the axis 8 and is located such that it faces the transverse stop surface 24 formed on the primary valve member 2. When the primary and secondary valve members are in their closed positions, as illustrated in FIG. 1, the stop surface 40 will be displayed away from the stop surface 24 by a distance D24/40 which is less than the distance D22 by which the solid collar 22 extends into the bore hole 6.

Chamber 41, bounded by the bore hole 5, constitutes part of the fluid flow passageway connecting the first and second enclosures 9 and 11, respectively, when the primary and secondary valve members are in their opened positions. Although not illustrated in the Figures, the valve may be equipped with additional aperture controls.

As can be seen, sealing of the fluid flow passageway is achieved by pressing the frusto-conical sealing surface 18 against the sharp-edged valve seat 19, which compression will also cut any foreign particles which may be wedged between the edge and the frusto-conical surface. Sealing is also achieved by pressing the annular, spherical sealing surface 31 into contact with the annular spherical valve seat 12. The elasticity constituted by the spring 36 between the primary and secondary valve members will allow the secondary valve member 3 to pivot freely with respect to the primary valve member 2 to achieve independence between the first and second sealing surfaces. Thus, in the event that an undesired foreign particle was wedged between the edge 19 and the frusto-conical surface 18, thereby preventing sealing between these elements, the sealing would be nevertheless carried out between the sealing surface 31 and the valve seat 12.

The O-ring seal precludes any uncontrolled flow between the volumes 39 and 37 and, via clearances J and K, between the volume 39 and the second enclosure 11 when the secondary to sealing surface 31 and the secondary valve seat 12 are in their sealing configuration. This requires that distance D22 be larger than D24/40 such that stop surfaces 24 and 40 must contact each other before the grooves 21 communicate with the volume 39 in order to properly meter the flow rate of the fluid passing through the valve assembly. In the open configuration of the valve assembly, the valve members 2 and 3 will move as a unit along axis 8 to displace the primary and secondary sealing surfaces away from their respective valve seats.

The advantages of the above-described valve assembly reside in the redundancy of sealing whereby the complete sealing of the fluid flow passageway is achieved as well as the independence of the two sealing functions from each other. The valve assembly according to this invention has found particular use in fuel feed circuits for the fuel injectors of gas turbine engines.

The foregoing description is provided for illustrative purposes only and should not be construed as in any way limiting this invention, the scope of which is defined solely by the appended claims.

We claim:

1. A fluid valve assembly comprising:
   a) a valve body defining a flow passageway therethrough, an edge portion forming a first valve seat in the fluid flow passageway, and an annular surface having a generally spherical configuration forming a second valve seat in the fluid flow passageway;
   b) a primary valve member located in the fluid flow passageway so as to be movable between closed and open positions along an axis, the primary valve member defining a first sealing surface configured to contact the first valve seat when the primary valve member is in its closed position;
   c) a secondary valve member located in the fluid flow passageway so as to be movable between closed and open positions along the axis, the secondary valve member defining a second sealing surface having a generally spherical configuration so as to contact the second valve seat when the secondary valve member is in its closed position; and,
   d) connecting means connecting the primary and secondary valve members.

2. The valve assembly of claim 1 wherein the primary valve member defines a bore hole extending partially therethrough and further comprising a generally cylindrical extension extending from the secondary valve member into the bore hole defined by the primary valve member.

3. The valve assembly of claim 2 wherein the generally cylindrical extension is hollow and has an end wall defining an opening and wherein the connecting means comprises:
   a) a rod located in the hollow cylindrical exterior having a first end extending through the opening defining a clearance J therebetween and attached to the primary valve member, and a second end having a headed portion defining a clearance K with the cylindrical extension; and,
   b) resilient biasing means extending between the end wall and the headed portion.

4. The valve assembly of claim 1 wherein the primary valve member has an outer surface defining a plurality of spaced grooves parallel to the axis a distance less than the axial length of the primary valve member.

5. The valve assembly of claim 4 further comprising a solid cylindrical collar portion formed on the primary valve member axially displaced from the first sealing surface.

6. The valve assembly of claim 1 wherein the connecting means allows relative axial movement between the primary and secondary valve members and further comprising:
   a) a first stop surface on the primary valve member; and,
   b) a second stop member on the secondary valve member located such that relative axial movement between the primary and secondary valve members is limited by contact between the first and second stop surfaces.

7. The valve assembly of claim 6 further comprising a bore defined the valve body slidably receiving the solid cylindrical portion of the primary valve member.

8. The valve assembly of claim 7 wherein, in the closed positions of the primary and secondary valve members, the solid cylindrical portion of the primary valve member extends into the bore a distance $D22$ and the first and second stop surfaces are separated a distance $D\ 24/40$ such that the $D22$ is greater than $D24/40$.

9. The valve assembly of claim 1 wherein the first sealing surface has a frusto-conical configuration symmetrical about the axis.

* * * * *